(12) United States Patent
Grey et al.

(10) Patent No.: US 8,234,089 B2
(45) Date of Patent: Jul. 31, 2012

(54) AUTO-SCHEDULING OF TESTS

(75) Inventors: James A. Grey, Cedar Park, TX (US); Daniel Elizalde, Austin, TX (US)

(73) Assignee: National Instruments Corporation, Austin, TX (US)

( * ) Notice: Subject to any disclaimer, the term of this patent is extended or adjusted under 35 U.S.C. 154(b) by 1024 days.

(21) Appl. No.: 10/289,798

(22) Filed: Nov. 7, 2002

(65) Prior Publication Data

US 2004/0093180 A1    May 13, 2004

(51) Int. Cl.
*G01R 29/00*    (2006.01)
(52) U.S. Cl. .................................. 702/123; 702/119
(58) Field of Classification Search .................. 702/108, 702/117, 118, 119, 121, 123, 182
See application file for complete search history.

(56) References Cited

U.S. PATENT DOCUMENTS

| | | | | |
|---|---|---|---|---|
| 4,354,227 | A * | 10/1982 | Hays et al. ..................... | 710/240 |
| 4,604,694 | A * | 8/1986 | Hough .......................... | 710/200 |
| 5,261,097 | A | 11/1993 | Saxon .......................... | 718/106 |
| 5,408,663 | A * | 4/1995 | Miller ........................... | 718/104 |
| 5,524,078 | A * | 6/1996 | Kolb et al. ...................... | 701/29 |
| 5,544,308 | A * | 8/1996 | Giordano et al. ............... | 714/26 |
| 5,838,766 | A * | 11/1998 | Rand ............................ | 379/9 |
| 5,857,192 | A * | 1/1999 | Fitting .......................... | 707/200 |
| 5,893,157 | A * | 4/1999 | Greenspan et al. ........... | 711/150 |
| 6,002,868 | A | 12/1999 | Jenkins et al. ................ | 717/105 |
| 6,023,773 | A | 2/2000 | O'Donnell et al. ............. | 714/40 |
| 6,112,222 | A * | 8/2000 | Govindaraju et al. ........ | 718/102 |
| 6,151,022 | A * | 11/2000 | Alshibani et al. ............. | 715/788 |
| 6,336,088 | B1 | 1/2002 | Bauman et al. ................ | 703/15 |
| 6,397,378 | B1 | 5/2002 | Grey et al. .................... | 717/175 |
| 6,502,102 | B1 * | 12/2002 | Haswell et al. ............... | 707/102 |
| 6,570,385 | B1 * | 5/2003 | Roberts et al. ................ | 324/378 |
| 6,697,750 | B1 * | 2/2004 | Coin et al. .................... | 702/108 |
| 6,708,324 | B1 * | 3/2004 | Solloway et al. ............. | 717/124 |
| 6,738,813 | B1 * | 5/2004 | Reichman ..................... | 709/224 |

(Continued)

OTHER PUBLICATIONS

National Instruments Corporation, LabVIEW, "Test Executive Reference Manual," Aug. 1997.

Johnson, Laura, "Test and Measurement—Understanding Test Executives," Webpage www.testandmeasurement.com.content/news/, Oct. 16, 2000, pp. 1-9.

*Primary Examiner* — Jeffrey R West
(74) *Attorney, Agent, or Firm* — Meyertons Hood Kivlin Kowert & Goetzel, P.C.; Jeffrey C. Hood; Mark S. Williams

(57) ABSTRACT

System and method for performing a multiple tests on each of one or more units, where each of the tests requires a respective resource of a plurality of resources. A first test is performed on a unit using a first resource. During performance of the first test, a search is made for a second test, requiring a second resource, where the second resource is not currently being used. If the second test is found, the second test is performed on the unit, or a second unit, using the second resource, substantially concurrently with at least a portion of the first test being performed on the unit. Performing a test includes locking the respective resource to exclude use by other tests, including acquiring the resource, and unlocking the resource upon completion of the test, including releasing the resource for use in performing the respective test on another of the units.

36 Claims, 9 Drawing Sheets

U.S. PATENT DOCUMENTS

| | | | |
|---|---|---|---|
| 6,738,974 B1* | 5/2004 | Nageswaran et al. | 718/104 |
| 6,842,022 B2* | 1/2005 | Khoche | 324/754 |
| 2001/0044913 A1* | 11/2001 | Brassac et al. | 714/33 |
| 2002/0124205 A1* | 9/2002 | Grey et al. | 714/33 |
| 2003/0093524 A1* | 5/2003 | Goldick | 709/225 |
| 2003/0120825 A1* | 6/2003 | Avvari et al. | 709/316 |
| 2003/0160826 A1* | 8/2003 | Tran et al. | 345/771 |
| 2003/0212523 A1* | 11/2003 | Dorough et al. | 702/119 |

* cited by examiner

| Sequence File3 * | |
|---|---|
| Main | Setup | Cleanup | Parameters | Locals | |
| Step | Description |
| Begin Auto-Schedule | Begin Auto-Schedule |
| Lock Resource | Lock: "DMM" |
| Test 1 | Numeric Limit Test, 0 <= x <= 10 |
| Unlock Resource | Unlock Resource |
| Lock Resource | Lock: "Scope" |
| Test 2 | Numeric Limit Test, 0 <= x <= 10 |
| Unlock Resource | Unlock Resource |
| Lock Resource | Lock: "Camera" |
| Test 3 | Numeric Limit Test, 0 <= x <= 10 |
| Unlock Resource | Unlock Resource |
| End Auto-Schedule | End Auto-Schedule |
| END | |

Fig. 7A

| | Auto-Schedule | | | | | | | | | | |
|---|---|---|---|---|---|---|---|---|---|---|---|
| UUT1 | Test1 | Test2 | Test3 | | | | | | | | |
| UUT2 | Test2 | Test3 | | Test1 | | | | | | | |
| UUT3 | Test3 | | Test1 | Test2 | | | | | | | |
| UUT4 | | Test1 | Test2 | Test3 | | | | | | | |

Fig. 7B

AUTO-SCHEDULING OF TESTS

FIELD OF THE INVENTION

The present invention relates to the field of test executive software for organizing and executing test executive sequences. In particular, the invention relates to a system and method for efficient execution of multiple tests on one or more units.

DESCRIPTION OF THE RELATED ART

Test executive software is specialized software that allows a user to organize and execute sequences of reusable test modules to test units under test (UUTs). For example, the test modules may interact with one or more hardware instruments to test the UUT(s). The test modules often have a standard interface and typically can be created in a variety of programming environments. The test executive software operates as a control center for the automated test system. More specifically, the test executive software allows the user to create, configure, and/or control test sequence execution for various test applications, such as production and manufacturing test applications. Text executive software typically includes various features, such as test sequencing based on pass/fail results, logging of test results, and report generation, among others.

Test executives include various general concepts. The following comprises a glossary of test executive nomenclature, as used herein:

Code Module—A program module, such as a Windows Dynamic Link Library (.dll), LabVIEW VI (.vi), ActiveX component, or other type of program module or component, that implements one or more functions that perform a specific test or other action.

Test Module—A code module that performs a test of a UUT.

Step—An action that the user can include within a sequence of other actions. A step may call a test module to perform a specific test.

Step Module—The code module that a step calls.

Sequence—A series of steps that the user specifies for execution in a particular order. Whether and when a step is executed can depend on the results of previous steps.

Sequence File—A file that contains the definition of one or more sequences.

Sequence Editor—A program that provides a graphical user interface for creating, editing, and debugging sequences.

Run-time Operator Interface—A program that provides a graphical user interface for executing sequences on a production station. A sequence editor and run-time operator interface can be separate application programs or different aspects of the same program.

Test Executive Engine—A module or set of modules that provide an API for creating, editing, executing, and debugging sequences. A sequence editor or run-time execution operator interface uses the services of a test executive engine.

Application Development Environment (ADE)—A programming environment such as LabVIEW, LabWindows/CVI, Microsoft Visual C++, Microsoft Visual Basic, etc., in which the user can create test modules and run-time operator interfaces.

Unit Under Test (UUT)—The device or component that is being tested.

Thus, the user may use the sequence editor to construct a test executive sequence comprising a plurality of steps. The test executive sequence may then be executed to perform tests of a system or UUT.

In some systems, multiple UUTs may be tested in parallel. This approach generally increases the testing system performance since it allows multiple units to be tested at the same time. For example, a plurality of tests may be performed on each of a plurality of UUTs, where each test may require exclusive use of one or more resources, e.g., oscilloscope, sensor, digital multi-meter (DMM), etc., during execution of the test, e.g., by using respective execution threads to test respective units in parallel. However, when performing parallel testing, inefficiencies may result when executing threads must wait for a specific resource or resources to be released.

FIGS. 1A and 1B illustrate a prior art approach to parallel test scheduling, where three tests are performed on four UUTs. FIG. 1A illustrates a test step sequence where a first test, Test 1, requires use of a DMM, a second test, Test 2, requires use of an oscilloscope, and a third test, Test 3, requires use of a camera. As is well-known in the art, when a resource is used exclusively for a test, the resource is typically locked prior to the test execution, then released after the test execution. Thus, in the test sequence shown in FIG. 1A, the sequence contains the necessary synchronization steps to ensure that no two threads access the same resource at the same time. Protecting the test step with locks is needed to avoid collisions, i.e., simultaneous requests for resources, since there is only one instance of each resource (e.g., DMM, oscilloscope, camera) and the resources will be shared (sequentially) by all the UUTs being tested in parallel. Thus, as FIG. 1A shows, for a given UUT, the DMM is first locked, then Test 1 is performed. Once Test 1 is complete, the DMM is unlocked. The test sequence then locks the oscilloscope ("scope"), performs Test 2 on the UUT, and upon completion of Test 2 unlocks the oscilloscope, as shown. Finally, the camera is locked, Test 3 is performed on the UUT, and the camera is unlocked, after which the test sequence for that UUT is terminated.

FIG. 1B is a table illustrating execution flow of testing 4 UUTs in parallel using the test sequence of FIG. 1A. As FIG. 1B shows, the test sequence is applied to each UUT in a staggered fashion to prevent resource request conflicts. However, a problem with this approach is that there are some idle hardware times. As may be seen, at the beginning of the test, when UUT1 is performing Test 1 (and using the associated resources), the other units are held idle, waiting for the resource to become available. When the resource for Test 1 becomes available, UUT 2 can start the testing process, leaving UUT 3 and UUT 4 still idle. As Test 1 is completed for each UUT, the resources for Test 1 are freed for use in performing Test 1 on the next UUT. This staggered sequencing is performed for each of the tests, leading to idle resources in the first portion of the testing and the last portion of the testing. In other words, in the table of FIG. 1B, any time during the test procedure that the UUTs are not being tested represents an inefficiency, i.e., wasted time. Similarly, in situations where multiple tests are to be performed on a single UUT, simple linear performance of the tests may result in substantial resource idle time.

Thus, it would be desirable to provide improved systems and methods for performing parallel testing on one or more units under test.

SUMMARY OF THE INVENTION

Various embodiments of a system and method for performing a plurality of tests on each of one or more units under test (UUT) are presented, where each of the plurality of tests requires or is associated with a respective resource of a plurality of resources. The plurality of tests may be specified in a test sequence, also referred to as an auto-scheduled test sequence, described below. A plurality of execution threads may be used to perform at least a portion of two or more of the tests substantially in parallel. In an embodiment where the plurality of tests are to be performed on each of a plurality of units, a thread may be associated with each unit. In an embodiment where the plurality of tests is to be performed on a single unit, each thread may be associated with one or more of the tests, or may simply perform any of the tests as each is able. The threads may in effect compete for use of the resources to perform respective tests on the unit or units by each performing an embodiment of the method described below.

It is noted that a test may be a single operation, or may be two or more operations or subtests. In other words, a "test" may actually refer to multiple tests. Similarly, a resource may be a single device or component (or program), or may include multiple devices or components (or programs). Thus, when a test is performed on a unit using a resource, it may be that multiple subtests (i.e., tests) are performed on the unit (or a component of the unit) using a plurality of devices. It should be noted that in other embodiments, described below, the method may be performed by a plurality of threads to perform a plurality of tests on a single unit.

In one embodiment, the plurality of tests may be searched for a next test to perform on the unit, where 1) the test has not been performed on the unit, and 2) the respective resource of the test is available for use. In other words, an attempt may be made to determine a test whose associated resource is not currently being used to perform another test, or to perform the same test on another unit. If the test is not found, the method may check against a time-out condition, and if a time-out has occurred, the method may exit. If no time-out has occurred, then the method may continue searching. In other words, if the respective test for the respective unit is not found, the method may continue the searching until the respective test is found, or an ending condition, e.g., a time-out condition, is met. If the respective test is found, then the respective resource of the respective test may be locked, where locking includes acquiring the respective resource. In other words, once a free resource for a desired test is determined, the method may lock the resource, thereby excluding use of the resource by execution threads for other tests. The respective test may then be performed on the unit, e.g., the locked resource may be used to perform the associated test on the UUT.

Once the test has been performed, the respective resource may be unlocked, thereby releasing the resource for use by other tests/threads. As noted above, in one embodiment, multiple execution threads may operate substantially in parallel, performing respective tests, e.g., on associated UUTs, as the respective resources become available. In other words, two or more of the respective tests on the respective units may be performed substantially concurrently, e.g., by respective execution threads. In another embodiment, at least portions of the searching, locking, performing, and unlocking for a plurality of the respective tests may be performed substantially concurrently.

After the respective resource has been unlocked, an ending condition may be checked, and if the ending condition is met the method may exit, otherwise, the method may proceed searching for another test to perform on the unit, as described above. In one embodiment, searching for the next test may be performed iteratively. For example, the searching, locking, performing, and unlocking may be performed by the execution thread until 1) each of the plurality of tests has been performed on the unit, and/or 2) an ending condition is met. Considering all of the execution threads together, the searching, locking, performing, and unlocking may be performed (by the various execution threads) until 1) each of the plurality of tests has been performed, e.g., on each of the plurality of units, and/or 2) the ending condition is met. The ending condition may include time-outs, equipment failure, manual or automatic termination of the test process, and/or any other type of ending condition.

Once the resource associated with the test has been unlocked, the method may further include searching for another, i.e., a different, test of the plurality of tests to be performed on the respective unit, where 1) the different test requires another, i.e., a different, resource of the plurality of resources, and 2) the different resource is not currently being used. If the different test is found, then the method may perform the different test on the respective unit using the different resource, where performing the different test on the respective unit is performed substantially concurrently with performing the respective test on the different one of the plurality of units. In other words, once the respective test has been performed on the respective unit, e.g., by a first thread, not only may the method find and perform another test on the respective unit, but the method may also find and perform the respective test on another unit, assuming that the respective test has not yet been performed on the other unit.

The general concepts presented above may also be applied to performing multiple tests on a single unit. In other words, the method may perform multiple tests on a single unit, where at least a portion of two or more of the tests are performed substantially concurrently. In this embodiment, multiple execution threads may be launched, where each thread may perform an embodiment of the above method in order to perform a particular test on the UUT. Thus, in one embodiment, if there are three tests to be performed on the unit, three threads may be launched, where each thread is capable of performing any of the three tests on the unit. In other embodiments, the number of threads may not equal the number of tests, but rather two or more threads may operate to perform three or more tests between them.

Thus, similar to the method described above, in one embodiment, the method may include searching the plurality of tests to determine a respective test, where the respective test has not been performed on the unit, and where the respective resource of the respective test is available for use. If the respective test is found, the respective resource of the respective test may be locked (acquired), and the respective test performed on the unit. The respective resource of the respective test may then be unlocked (released). In a preferred embodiment, at least portions of the searching, locking, performing, and unlocking for a plurality of the respective tests may be performed substantially concurrently. The searching, locking, performing, and unlocking may be performed iteratively until each of the plurality of tests has been performed on the unit, or until a stopping condition is met, e.g., due to hardware problems, manual termination, etc. Thus, various embodiments of the method may be used to perform a plurality of tests on a single unit.

It should be noted that in other embodiments, the two approaches described above may be combined. In other words, multiple threads may be used to perform a plurality of tests on each of a plurality of units, where at least a portion of the tests are performed in substantially parallel fashion, and in doing so, multiple tests may be performed (by multiple threads) on a respective unit in a substantially concurrent manner.

In some situations, the above described methods may result in thread "starvation", where various factors such as processing bias and/or circumstance may prevent or exclude a thread from acquiring a resource to perform a test. In other words, because each of the threads are effectively competing for test resources, in some cases a particular thread may be prevented from ever (or at least for a relatively long time, e.g., before a time-out condition occurs) acquiring a resource. Thus, in an embodiment of the method where the searching, locking, performing, and unlocking are performed by a respective execution thread, each of the plurality of resources may be associated with it a respective queue structure or its equivalent, e.g., a FIFO (first in, first out), for storing threads waiting for the respective resource. In this case, searching the plurality of tests to determine a respective test may include each thread examining the plurality of resources to determine a free resource (i.e., unlocked), and if a free resource is found, determining the respective test associated with the free resource. If no free resource is found, the method may determine a resource of the plurality of resources with fewest threads in the FIFO for that resource, and add the thread to the FIFO for that resource. In one embodiment, when the respective resource is acquired, i.e., when the execution thread locks the resource, the thread may be removed from any other FIFOs storing the thread. In other words, once the thread successfully finds a free resource, the thread may be removed from any FIFOs in which the thread is still waiting.

While in many embodiments, the auto-scheduled test sequences described above may be generated manually by a user, it may be desirable to provide means for more easily generating auto-scheduled test sequences. Thus, in one embodiment, program instructions implementing a tool or interface for generating auto-schedule test sequences may be provided in the form of a stand-alone application, a dynamic linked library, and/or a plug-in program module for an existing application, such as, for example, National Instruments TestStand product. In another embodiment, the program instructions may simply be integrated into an existing program, thereby extending the functionality of the program to include the desired features.

In a preferred embodiment, for a test sequence to be performed in auto-scheduled mode, at least one auto-scheduled block plus one or more auto-scheduled sections may be included. Thus, in one embodiment, a graphical user interface (GUI) may present menu options to the user for creating, modifying, and otherwise specifying the auto-scheduled block and the one or more auto-scheduled sections. In other words, in one embodiment, a test sequence may be created in response to user input, where creating the test sequence includes receiving user input requesting an automatic scheduling feature, and programmatically creating one or more steps in the test sequence to enable the automatic scheduling feature. The one or more steps may include at least one auto-schedule block, including a plurality of auto-scheduled sections, each specifying a respective test of the plurality of tests and a respective resource of the plurality of resources for use in performing the respective test.

In one embodiment, when creating a sequence, the user may simply insert a "Begin Auto-Schedule" step. This step may include configuration menus that allow the user to add auto-scheduled sections and/or a timeout, e.g., by right clicking on the "Begin Auto-Schedule" step and selecting an "Add Auto-Scheduled Section" option. Thus, in one embodiment, for ease of use, the GUI may automatically insert additional steps that are needed.

In one embodiment, a "Begin Auto-Schedule" step and a corresponding "END" step may be generated, e.g., in response to user input received by the GUI. Once the begin/end steps of the auto-schedule block have been added to the test sequence file, the user may select another menu option indicating the addition of an auto-scheduled section, resulting in insertion of an auto-scheduled section (possibly including a "Lock Resource" and an "Unlock Resource" step) as well as an "End Auto-Schedule" step. In one embodiment, a label may also be added that shows where the user-defined or specified test steps must be added for each auto-scheduled section. Thus, in response to receiving user input indicating the addition of an auto-schedule section, the GUI may programmatically insert one or more steps in the test sequence for specifying a respective test to be performed. This operation may be repeated as many times as needed for each application. For example, if an application requires locking three sets of instruments, then three auto-scheduled sections may be inserted.

Once an auto-scheduled section has been inserted, the resource (or group of resources) that section will utilize may be configured, e.g., by right clicking on the corresponding "Lock Resource" step and selecting a "Configure Lock Resource . . . " option or its equivalent. A pop-up dialog may be displayed and the user may provide input, e.g., a string, indicating the name of the resource to lock, or a selection from a list of available resources. If the section utilizes more than one resource, an array of strings may be entered, where each string contains the name of the resource to lock. The "Lock Resource" step may automatically create a Lock for each of the names indicated, i.e., manual creation of the locks may not be required. In one embodiment, if a Lock for an indicated resource (name) already exists, the "Lock Resource" step type may connect to the existing Lock. Thus, in a preferred embodiment, further user input may be received by the GUI specifying the resource and the desired steps needed to perform the respective test using that resource, e.g., by an "Insert Step" menu option. The user may thus add and specify successive auto-schedule sections for the auto-schedule block, where each section indicates or performs a respective test using a respective resource.

As mentioned above, in one embodiment, the auto-scheduled step types may include a timeout feature, thus, in addition to specifying the auto-schedule sections, an option may be presented to the user for specifying a time-out condition for the auto-schedule block. In one embodiment, the specified timeout may be applied to all of the auto-scheduled sections. In other words, the auto-scheduled steps may be viewed as a group or block that performs a particular function, e.g., a test suite, and thus, in this embodiment, the timeout may be defined at the top level and may be applied to every auto-scheduled section inside the auto-schedule block. If an auto-scheduled block times-out, it indicates that one of the auto-scheduled sections was not able to acquire its resources within the specified time. In one embodiment of the GUI, a timeout may be set by right clicking on the "Begin Auto-Scheduled" step and selecting the option "Set Auto-Schedule Timeout . . . ". A pop-up dialog may be displayed presenting the option to enable or disable the timeout for the current block. In one embodiment, the GUI may also allow the user to specify whether a timeout causes a runtime error or simply terminates.

It should be noted that the above approach may be used to generate additional auto-schedule blocks, with respective auto-schedule sections, time-out specifications, etc.

Although the above described embodiment is implemented as a set of steps organized into an auto-schedule block, other approaches are also contemplated. For example, the plurality of tests may be included in a selection structure, such as a case statement, as is well-known in the art. This type of selection structure may be implemented in a variety of ways, including, but not limited to, graphical programming languages such as National Instruments "G" language, used in the LabVIEW graphical program development environment, and text-based programming languages, such as C, C++, etc.

In an embodiment where the selection structure is a case statement, each of the plurality of auto-scheduled sections may comprise or may be included as a respective case in the case statement. In one embodiment, each respective case may be selectable based on a label indicating the respective resource, where the respective resource is not currently in use. In another embodiment, the label for each case may indicate the test instead of the resource, where the associated resource is implied by the test. The locking and/or unlocking functionality for resource management may be performed by case-specific code inside each respective case section, or alternatively, by implicit program instructions connected or associated with the case. Additionally, other functionality required by the testing process may also be provided by explicit or implicit code.

For example, in one embodiment of the auto-schedule case statement, there may be no explicit selection variable used to select the case, i.e., to match with the case label. Rather, an "auto-schedule" block indicator at the beginning of the case statement may have associated code that manages an iterative process whereby each case is considered based on resource availability and whether the case, i.e., the test, has already been performed on the unit. In one embodiment, each "case", e.g., case "Camera", may have associated code that determines the availability of the respective resource and/or keeps track of whether the test has already been performed on the unit.

Alternatively, explicit code may be provided for the above described functionality. For example, the case statement may be embedded in a loop for iterative consideration of each case/test. As another example, an explicit function may be provided that determines the next test to be performed.

Thus, in various embodiments, auto-schedule test sequences may be created that substantially improve efficiencies of test procedures by reducing testing resource idle time. Additionally, the auto-schedule test sequences may be generated via a GUI, where the GUI programmatically inserts steps and/or structures into the test sequence in response to user input.

BRIEF DESCRIPTION OF THE DRAWINGS

A better understanding of the present invention can be obtained when the following detailed description of the preferred embodiment is considered in conjunction with the following drawings, in which:

FIGS. 1A and 1B illustrate scheduling and execution flow of test executive sequences for multiple units under test in parallel, according to the prior art;

FIG. 5 illustrates one example of a test executive sequence, created according to one embodiment of a test executive application;

FIGS. 7A and 7B illustrate scheduling and execution flow of test executive sequences for one or more units under test in parallel, according to one embodiment;

Figure 2:
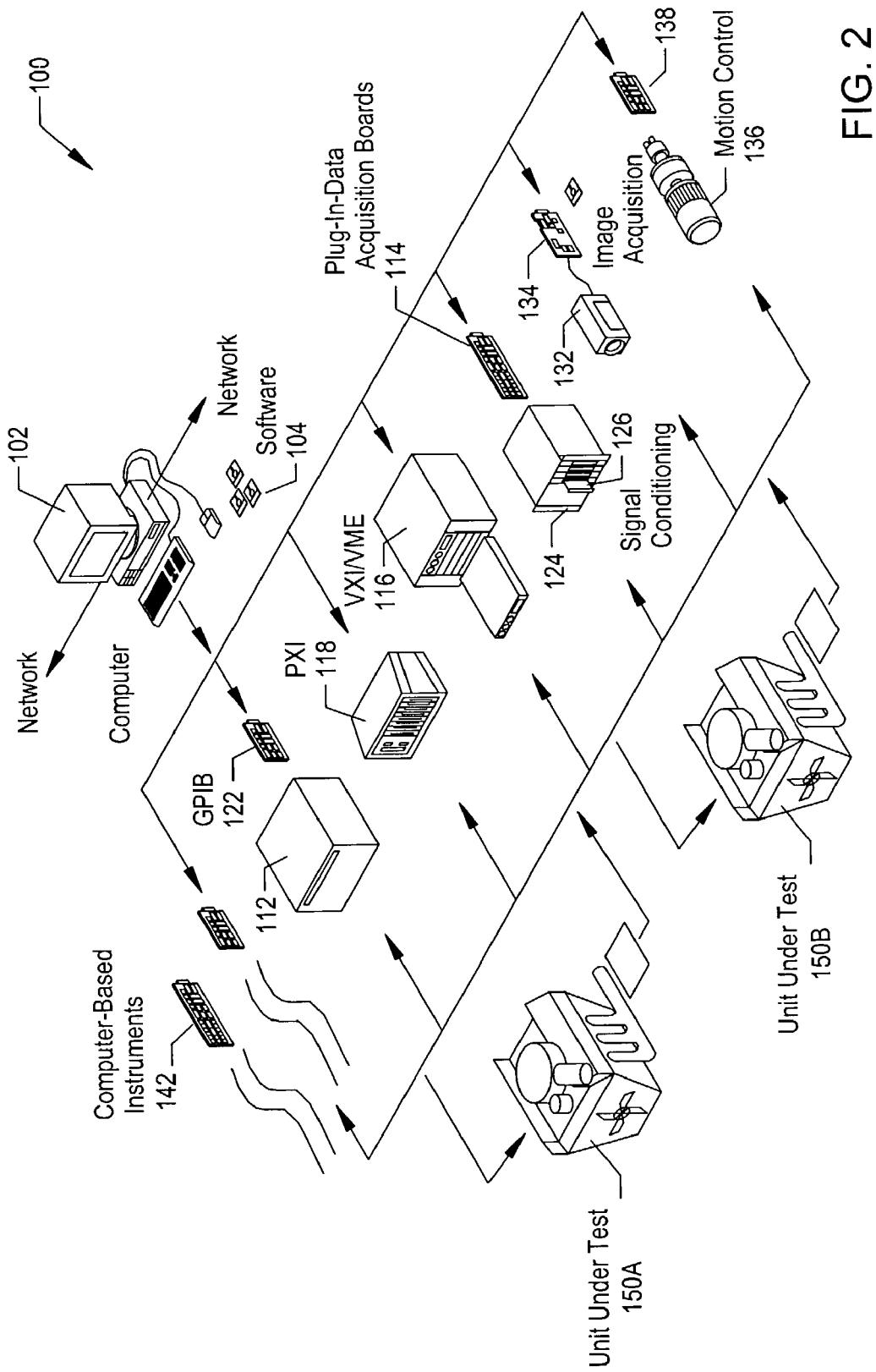
FIG. 2 illustrates an instrumentation control system according to one embodiment of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein.

U.S. patent application Ser. No. 09/259,162 titled "Test Executive System and Method Including Step Types for Improved Configurability," filed Feb. 26, 1999.

The LabVIEW and BridgeVIEW graphical programming manuals, including the "G Programming Reference Manual", available from National Instruments Corporation, are hereby incorporated by reference in their entirety.

The TestStand user manual, available from National Instruments Corporation, is also hereby incorporated by reference in its entirety.

FIG. 2—Instrumentation System

FIG. 2 illustrates an exemplary instrumentation control system 100. The system 100 comprises a host computer 102 that connects to one or more instruments. The host computer 102 comprises a CPU, a display screen, memory, and one or more input devices such as a mouse or keyboard as shown. The computer 102 may connect through the one or more instruments to analyze, measure or control one or more units under test (UUT) or processes 150, here represented by UUT 150A and UUT 150B. It is noted that FIG. 2 is exemplary only, and the present invention may be used in conjunction with any of various systems, as desired.

In one embodiment, the UUT may be a system comprising a plurality of sub-components, where respective tests are to be performed on each component. The computer 102 may execute a test executive sequence to perform automated tests of the system or portions of the system. As described below, the computer 102 may launch multiple execution threads to perform a plurality of tests, some of which may be performed substantially in parallel.

The one or more instruments may include a GPIB instrument 112 and associated GPIB interface card 122, a data acquisition board 114 and associated signal conditioning circuitry 124, a VXI instrument 116, a PXI instrument 118, a video device 132 and associated image acquisition card 134, a motion control device 136 and associated motion control interface card 138, and/or one or more computer based instrument cards 142, among other types of devices.

The GPIB instrument 112 may be coupled to the computer 102 via a GPIB interface card 122 provided by the computer 102. In a similar manner, the video device 132 may be coupled to the computer 102 via the image acquisition card 134, and the motion control device 136 may be coupled to the computer 102 through the motion control interface card 138. The data acquisition board 114 may be coupled to the computer 102, and optionally interfaces through signal conditioning circuitry 124 to the UUT. The signal conditioning circuitry 124 preferably comprises an SCXI (Signal Conditioning eXtensions for Instrumentation) chassis comprising one or more SCXI modules 126.

The GPIB card 122, the image acquisition card 134, the motion control interface card 138, and the DAQ card 114 are typically plugged in to an I/O slot in the computer 102, such as a PCI bus slot, a PC Card slot, or an ISA, EISA or Micro-Channel bus slot provided by the computer 102. However, these cards 122, 134, 138 and 114 are shown external to computer 102 for illustrative purposes. The cards 122, 134, 138 and 114 may also be implemented as external devices coupled to the computer 102, such as through a serial bus.

The VXI chassis or instrument 116 may be coupled to the computer 102 via a serial bus, MXI bus, or other serial or parallel bus provided by the computer 102. The computer 102 preferably includes VXI interface logic, such as a VXI, MXI or GPIB interface card (not shown), which interfaces to the VXI chassis 116. The PXI chassis or instrument is preferably coupled to the computer 102 through the computer's PCI bus.

A serial instrument (not shown) may also be coupled to the computer 102 through a serial port, such as an RS-232 port, USB (Universal Serial bus) or IEEE 1394 or 1394.2 bus, provided by the computer 102. In typical systems an instrument will not be present of each interface type, and in fact many systems may only have one or more instruments of a single interface type, such as only GPIB instruments.

The instruments are coupled to the unit under test (UUT) or process 150, or are coupled to receive field signals, typically generated by transducers. Other types of instruments or devices may be connected to the system, as desired.

The computer system 102 may include a memory medium on which test executive software according to one embodiment of the present invention is stored. The test executive software may allow a user to create, configure, and/or control test executive sequence execution for various test applications, such as production and manufacturing test applications. As described below, the test executive software may include functionality for performing multiple tests in a test executive sequence. The test executive software, possibly in the form of additional programs, may also provide means for generating the test executive sequence, e.g., in response to user input.

The term "memory medium" is intended to include an installation medium, e.g., a CD-ROM, floppy disks 104, or tape device; a computer system memory or random access memory such as DRAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer that connects to the first computer over a network, such as the Internet. In the latter instance, the second computer may provide program instructions to the first computer for execution. The host computer CPU executing code and data from the memory medium may comprise a means for implementing the methods described below.

Figure 3:
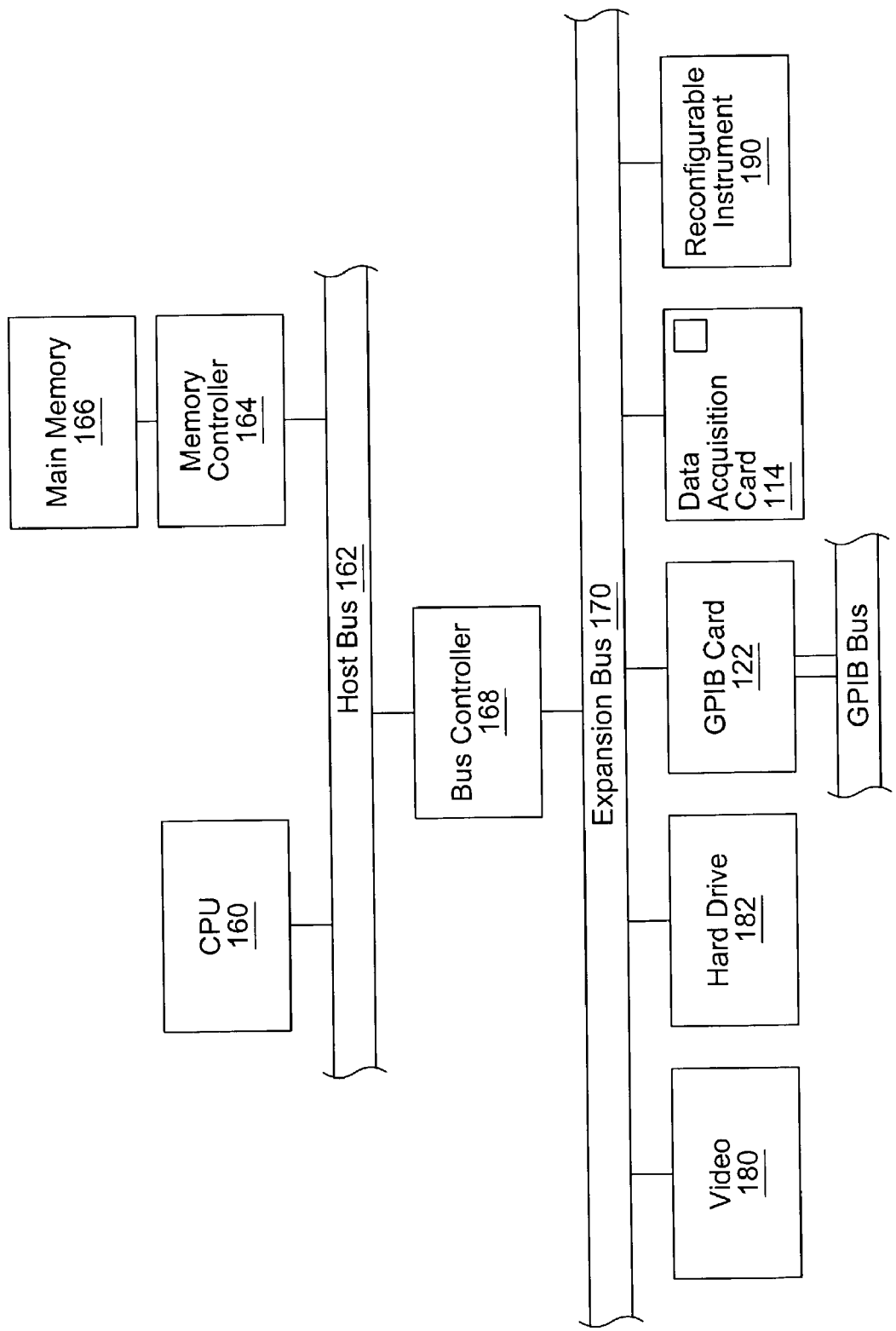
FIG. 3 is a block diagram of the computer system of FIG. 2.

FIG. 3—Computer System Block Diagram

FIG. 3 is a block diagram of the computer system illustrated in FIG. 2. It is noted that any type of computer system configuration or architecture can be used as desired, and FIG. 3 illustrates a representative PC embodiment. It is also noted that the computer system may be a general purpose computer system as shown in FIG. 2, a computer implemented on a VXI card installed in a VXI chassis, a computer implemented on a PXI card installed in a PXI chassis, or other types of embodiments. Elements of a computer not necessary to understand the present invention have been omitted for simplicity.

The computer 102 includes at least one central processing unit or CPU 160 that is coupled to a processor or host bus 162. The CPU 160 may be any of various types, including an x86 processor, e.g., a Pentium class, a PowerPC processor, a CPU from the SPARC family of RISC processors, as well as others. Main memory 166 is coupled to the host bus 162 by means of memory controller 164.

The main memory 166 may store software according to one embodiment of the present invention, such as test executive software with functionality as described above with reference to FIG. 2, and as described in detail below with reference to FIGS. 7A-9B. The main memory 166 may also store operating system software as well as other software for operation of the computer system, as well known to those skilled in the art.

The host bus 162 is coupled to an expansion or input/output bus 170 by means of a bus controller 168 or bus bridge logic. The expansion bus 170 is preferably the PCI (Peripheral Component Interconnect) expansion bus, although other bus types can be used. The expansion bus 170 includes slots for various devices such as the data acquisition board 114 (of FIG. 2) and a GPIB interface card 122 that provides a GPIB bus interface to the GPIB instrument 112 (of FIG. 2). The computer 102 further comprises a video display subsystem 180 and hard drive 182 coupled to the expansion bus 170.

As shown, a reconfigurable instrument 190 may also be connected to the computer 102. The reconfigurable instrument 190 may include a functional unit, also referred to as configurable logic, such as a programmable logic device (PLD), e.g., an FPGA, or a processor and memory, which may execute a real time operating system. Program instructions may be downloaded and executed on the reconfigurable instrument 190. In one embodiment, at least a portion of the test executive software described herein may execute on the reconfigurable instrument 190. In various embodiments, the functional unit may be comprised on an instrument or device connected to the computer through means other than an expansion slot, e.g., the instrument or device may be connected via an IEEE 1394 bus, USB, or other type of port. Also, the functional unit may be comprised on a device such as the data acquisition board 114 or another device shown in FIG. 2.

Test Executive Software Components

Figure 4:
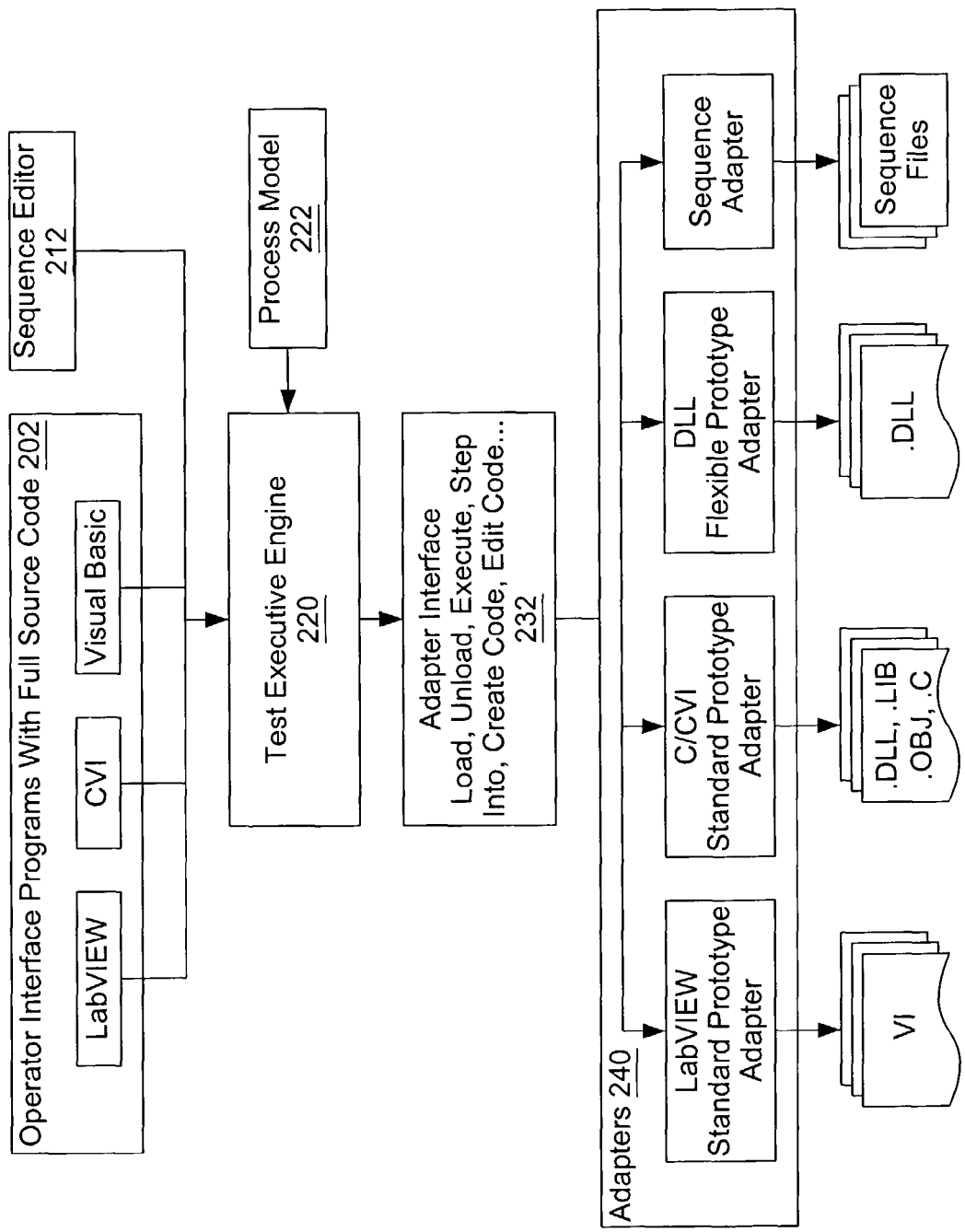
FIG. 4 illustrates a test executive application software architecture according to one embodiment of the present invention.

FIG. 4 is a block diagram illustrating high-level architectural relationships between elements of one embodiment of a test executive software application. It is noted that FIG. 4 is exemplary, and the present invention may be utilized in conjunction with any of various test executive software applications or architectures. In one embodiment, the elements of FIG. 4 are comprised in the TestStand test executive product from National Instruments. As shown, the test executive software of FIG. 4 includes operator interface programs 202 for interfacing to various software programs. The operator interface programs 202 shown in FIG. 4 are for creating operator interface programs using the LabVIEW, LabWindows/CVI, and Visual Basic application development environments. However, additional operator interface programs 202 may be included for development with other application development environments.

The test executive software of FIG. 4 also includes a sequence editor 212 for creating and editing test executive sequences. The sequence editor 212 and the operator interface programs 202 interface to the test executive engine 220. One or more process models 222 couple to the test executive engine 220. The test executive engine 220 interfaces through an adapter interface 232 to one or more adapters 240. The adapters shown in FIG. 4 include the LabVIEW standard prototype adapter, the C/CVI prototype adapter, the DLL flexible prototype adapter, and the sequence adapter. The LabVIEW standard prototype adapter interfaces to program modules having a .VI extension, i.e., LabVIEW graphical programs. The C/CVI prototype adapter interfaces to program modules having a .dll, .lib, .obj, or .c extension. The DLL flexible prototype adapter interfaces to program modules having a .dll extension. The sequence adapter interfaces to sequence files.

The test executive engine 220 manages the execution of test executive sequences. Sequences comprise steps that may call external code modules. By using module adapters 240 that have the standard adapter interface 232, the test executive engine 220 can load and execute different types of code modules. Thus, the test executive may be independent from particular application development environments (ADEs) used to create the code modules. In one embodiment, the test executive may use a special type of sequence called a process model to direct the high-level sequence flow. The test executive engine 220 may implement an API used by the sequence editor 212 and run-time operator interfaces 202.

Test Executive Sequence Editor

The sequence editor 212 may be an application program in which the user creates, modifies, and/or debugs test executive sequences. The sequence editor 212 may have a graphical user interface (GUI) enabling a user to efficiently create a test executive sequence for testing a system or unit under test. For example, the sequence editor 212 may provide the user with easy access to test executive features, such as step types, step properties, sequence parameters, step result collection, etc.

Figure 5:
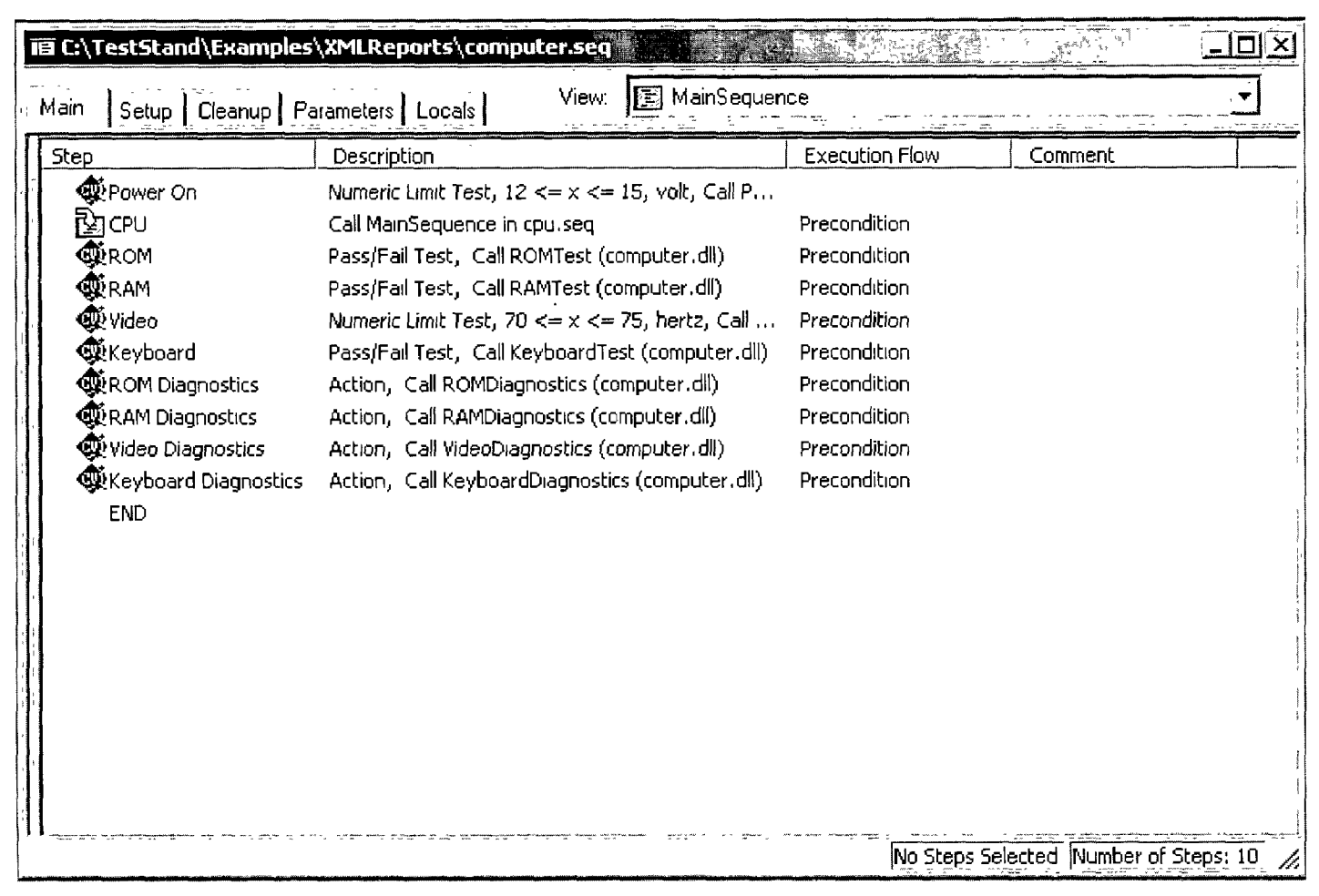
Figure 6:
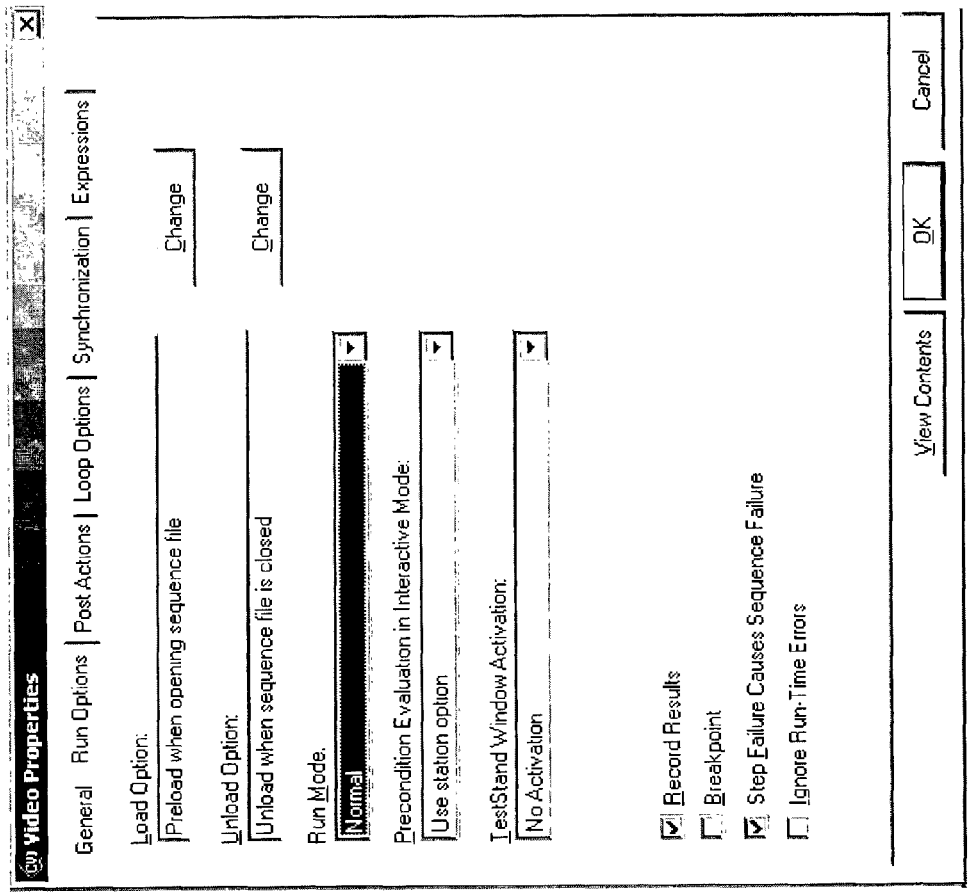
FIG. 6 illustrates an exemplary dialog box for a test executive step, which enables the user to specify various properties for the step that affect the way the test executive software manages the execution of the step.

FIG. 5 illustrates one example of a test executive sequence, created according to one embodiment of a sequence editor 212. The exemplary sequence of FIG. 5 comprises a plurality of test executive steps operable to test various aspects of a computer system. For example, the sequence includes a "ROM" step to test the computer's read-only memory, a "RAM" step to test the computer's random access memory, etc. Each step may call an external code module that interacts with the computer system to perform the desired test. The user may also specify various properties for each step that affect the way the test executive software manages the execution of the step. For example, FIG. 6 illustrates an exemplary dialog box for the "Video" step. As shown, a "Run Options" property page is selected in FIG. 6. The "Run Options" property page enables the user to specify various options for the step, such as whether to record test results for the step, whether to break execution when the step is reached, whether to pre-load the step when opening the sequence file, etc.

In one embodiment, the sequence editor 212 may also include an execution window that provides debugging tools, e.g., those found in application development environments such as LabVIEW, LabWindows/CVI, Microsoft Visual C/C++, Microsoft Visual Basic, etc. These may include features such as breakpoints, single stepping, tracing, a variable display, and a watch window.

In one embodiment, in the sequence editor 212, the user may start multiple concurrent executions. Multiple instances of the same sequence can be executed, and different sequences can be executed at the same time, e.g., as separate threads in a multi-threaded system. Executing multiple instances of the same sequence on different execution threads enables parallel testing of multiple UUTs, as described herein. In one embodiment, each execution instance may have its own execution window. In trace mode, the execution window may display the steps in the currently executing sequence. When execution is suspended, the execution window may display the next step to execute and provide single-stepping options.

Additional functionality of the sequence editor 212 according to embodiments of the present invention are described below with reference to FIGS. 7A-9B.

Test Executive Engine

The test executive engine 220 may be used when creating, editing, executing, and debugging test executive sequences. The test executive engine 220 may also provide a test executive engine application programming interface (API) that enables another program to interface with the test executive engine 220 in order to perform these actions. In one embodiment, the test executive engine 220 may export an object-based or component-based API, which in one embodiment may be an ActiveX Automation API. The sequence editor 212 and run-time operator interfaces 202 may use the test executive engine API. The engine API may be called from any programming environment able to use the API. For example, where the API comprises an ActiveX Automation API, the engine API may be called from any programming environment that supports access to ActiveX Automation servers. Thus, in various embodiments, the engine API may be called from test modules written in various programming environments, including test modules that are written in LabVIEW, LabWindows/CVI, Microsoft Visual C++, Microsoft Visual Basic, Java, etc.

One task performed by the test executive engine 220 is to manage the execution of test executive sequences. Executing a sequence may comprise executing steps included in the sequence. Not all steps in the sequence are necessarily executed. For example, the user may configure some steps to be skipped, e.g., depending on execution results of previous steps. For a step that references a user-supplied code module, executing the step may comprise executing the respective code module. In addition to these user-supplied code modules being executed, for each step, additional program instructions may be executed, wherein these additional program instructions implement additional functionality specified for the step. These additional program instructions may be specified by the test executive software, rather than being defined by the respective user-supplied code module for the step. As one example, when including a step in a sequence, the user may configure execution results of the step to be collected. In this example, when the step is executed, program instructions to store the step results accordingly may be executed in addition to the program instructions of a user-supplied code module that the step references. It is noted that not all steps may reference a user-supplied code module. For example, the test executive may provide some step types that primarily affect various aspects of sequence execution and are not designed to reference user-supplied code modules.

FIGS. 7A and 7B—Auto-Scheduling of a Test Executive Sequence

Figures 1A, 1B:
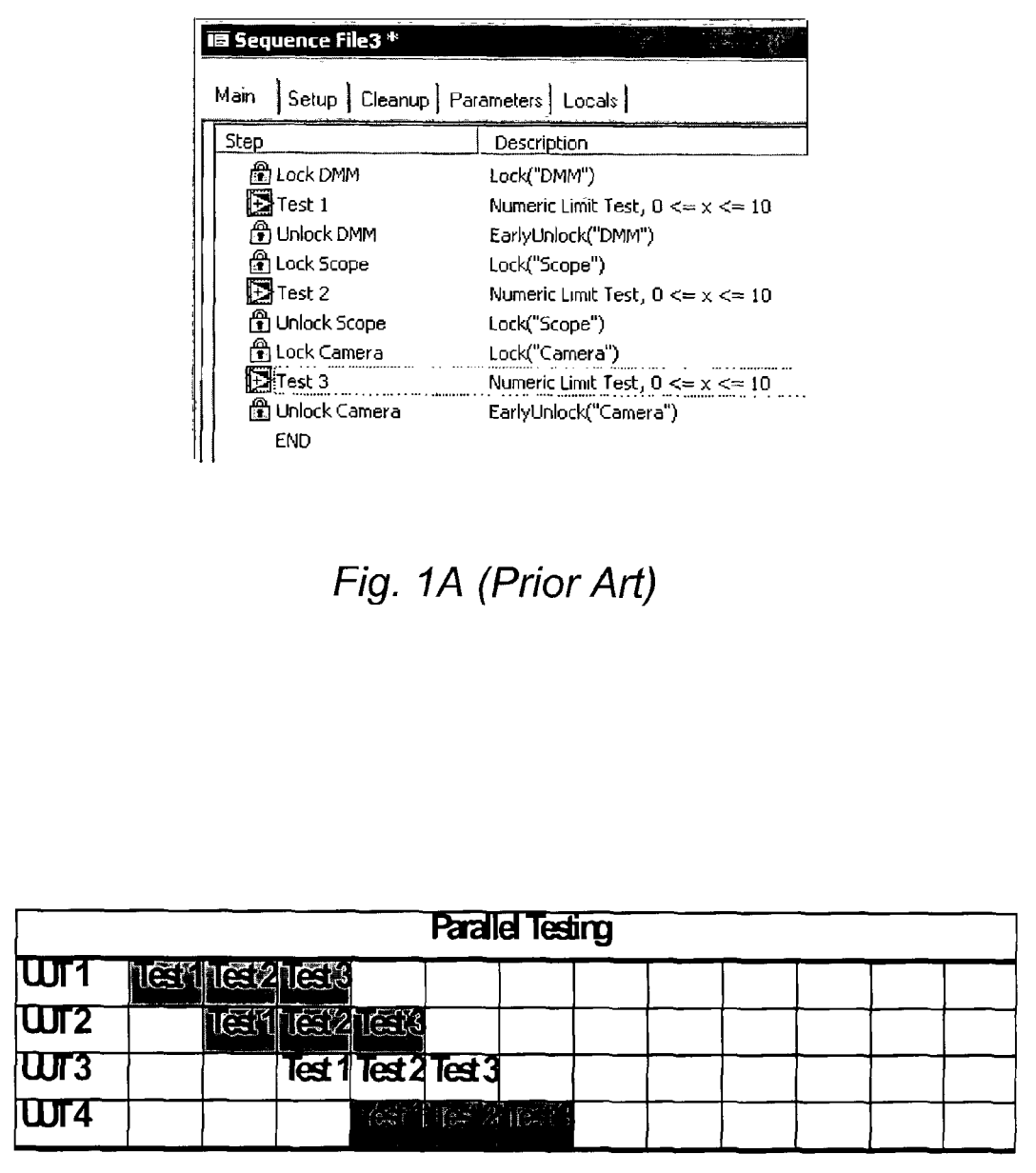

FIGS. 7A and 7B illustrate an approach to (substantially) parallel test scheduling, where a plurality of tests are to be performed on a plurality of UUTs using a respective plurality of resources, according to one embodiment. More specifically, FIGS. 7A and 7B illustrate an approach for performing the tests illustrated in prior art FIGS. 1A and 1B, where three tests are performed on four UUTs. It is noted that as used herein, the term "resource" refers to one or more devices, components, and/or programs used to perform a test, e.g., instruments, plug-in cards, etc. Also, as used herein, the term "test" refers to one or more operations performed on a unit using a resource. Thus, a test may itself include multiple sub-tests (which are themselves tests).

As illustrated in FIG. 7A, in one embodiment, the plurality of tests may be included in a test executive sequence. The test executive sequence may include at least one auto-schedule block, which may include a plurality of auto-scheduled sections. Each auto-scheduled section may specify a respective test of the plurality of tests, and a respective resource of the plurality of resources for use in performing the respective test.

As FIG. 7A shows, in this embodiment, the test sequence includes an auto-schedule block or group. In one embodiment, the auto-schedule block may include a begin step, indicating initiation of the auto-schedule block, the plurality of auto-scheduled sections, and an end step, indicating termination of the auto-schedule block. The begin step may include (possibly implicit) code or instructions to manage processing and execution of the auto-scheduled sections, for example, iteratively searching through the sections, as described in detail below with reference to FIG. 8. Similarly, the end step may have associated code that performs various functions or operations related to the termination of the testing sequence of the auto-schedule block, e.g., clean-up operations, etc.

In the embodiment shown, each of the plurality of auto-scheduled sections (in this case, three) includes a lock resource step indicating locking and acquiring a respective resource, a respective test of the plurality of tests which uses the locked and acquired resource, and an unlock resource step indicating unlocking and releasing the resource.

More particularly, FIG. 7A illustrates an example test sequence, e.g., a test executive sequence, where a first test, Test 1, requires use of a DMM, a second test, Test 2, requires use of an oscilloscope, and a third test, Test 3, requires use of a camera. The sequence of tests is to be performed on each of the four UUTs. As mentioned above, when a resource is used exclusively for a test, the resource is typically locked prior to the test execution, then released after the test execution. Thus, in the test sequence shown in FIG. 7A, each test step is protected with resource locks to avoid collisions, i.e., simultaneous requests for resources, since there is only one instance of each resource (e.g., DMM, oscilloscope, camera) and the resources may be shared (sequentially) by all the UUTs being tested in parallel (at least substantially).

Thus, as FIG. 7A shows, for each UUT, the DMM is to be locked, then Test 1 performed. Once Test 1 is complete, the DMM is to be unlocked. The test sequence also specifies that the oscilloscope ("scope") is to be locked, Test 2 performed on the UUT, and upon completion of Test 2 the oscilloscope unlocked, as shown. Finally, the test sequence specifies that the camera is to be locked, Test 3 performed on the UUT, and the camera unlocked. Once all three of these tests are performed on the UUT, the test sequence for that UUT is terminated, as indicated by the END test step.

It should be noted that in the test sequence shown, although the three tests are specified in a particular order, actual performance of the tests for each UUT may occur in different orders, depending on resource availability, as illustrated in FIG. 7B and described below. Thus, using the approach described herein the various tests may preferably be performed on the UUTs in various orders as needed to improve the efficiency of the testing procedure. It should be further noted that in a preferred embodiment, the test executive sequence shown is performed or implemented by each of a plurality of execution threads, where each thread corresponds to a respective UUT. Further details of using multiple execution threads to perform multiple tests in (substantially) parallel fashion are presented below with reference to FIG. 8.

Although the embodiment shown in FIG. 7A is implemented as a set of steps organized into an auto-schedule block, other approaches are also contemplated. For example, in an alternative embodiment, the plurality of tests may be included in a selection structure, such as a case statement, as is well-known in the art. Most programming languages include a case or select/switch statement where each case is labeled with a data item or variable value that is matched against an input value. This type of selection structure may be implemented in a variety of ways, including, but not limited to, graphical programming languages such as National Instruments "G" language, used in the LabVIEW graphical program development environment, and text-based programming languages, such as C, C++, etc.

For example, a typical textual language case statement may have the following form:

```
switch (k)
{
case kValueOne:
    // case-specific code here
    break;
case kValueTwo:
    // other case-specific code here
    break;
case kValueThree:
    // further case-specific code here
    break;
}
``` where the value of k determines which case is executed.

A textual Auto-schedule case statement corresponding to the test executive sequence of FIG. 7A may thus look like:

```
autoschedule
{
case "DMM1":
    // Use DMM 1 to perform test 1
    break;
case "Scope":
    // Use Oscilloscope to perform test 2
    break;
case "Camera":
    // Use Camera to perform test 3
    break;
}
``` where the selection structure may include the at least one auto-schedule block containing the plurality of auto-scheduled sections, as described above.

Thus, in an embodiment where the selection structure is a case statement, each of the plurality of auto-scheduled sections may comprise or may be included as a respective case in the case statement. In one embodiment, each respective case may be selectable based on a label indicating the respective resource, where the respective resource is not currently in use. In another embodiment, the label for each case may indicate the test instead of the resource, where the associated resource is implied by the test. The locking and/or unlocking functionality for resource management may be performed by case-specific code inside each respective case section, or alternatively, by implicit program instructions connected or associated with the case. Additionally, other functionality required by the testing process may also be provided by explicit or implicit code.

For example, note that in the auto-schedule case statement shown, there is no explicit "k value" used to select the case, i.e., to match with the case label. Rather, the "auto-schedule" block indicator at the beginning of the case statement may have associated code that manages an iterative process whereby each case is considered based on resource availability and whether the case, i.e., the test, has already been performed on the unit. In one embodiment, each "case", e.g., case "Camera", may have associated code that determines the availability of the respective resource and/or keeps track of whether the test has already been performed on the unit.

Alternatively, explicit code may be provided for the above described functionality. For example, the case statement may be embedded in a loop for iterative consideration of each case/test. As another example, an explicit function may be provided that determines the next test to be performed.

The following pseudo-code, based loosely on C/C++, illustrates one embodiment of a text-based implementation of the above test sequence:

```
// AutoSchedule
{
char *     resourceNames[3] =   {"DMM1", "Scope", "Camera"};
void *     sectionAddress[3] =  {&Section1, &Section2, &Section3};
int        sectionExecuted[3] = {FALSE, FALSE, FALSE};
double timeOut = 10.0;
void *     newInstructionPointer;
DetermineNextSection;
     newInstructionPointer =
_AcquireLockAndGetCodeAddressForNextAutoScheduleSection(3,
resourceNames,
sectionAddresses, sectionExecuted, &EndAutoSchedule, timeOut);
     asm
     {
     mov eip, newInstructionPointer
     }
Section1:
     UseDMM1(); // user supplied code for section1 compiled to here
     _ReleaseLock(resourcesNames[0]);
     goto DetermineNextSection;
Section2:
     UseScope(); // user supplied code for section2 compiled to here
     _ReleaseLock(resourcesNames[1]);
     goto DetermineNextSection;
Section3:
     UseCamera(); // user supplied code for section3 compiled to here
     _ReleaseLock(resourcesNames[2]);
     goto DetermineNextSection;
}
EndAutoSchedule:
// user supplied code immediately following the autoschedule block.
```

In this embodiment, the compiler implicitly supplies the _AcquireLockAndGetCodeAddress-ForNextAutoScheduleSection and _ReleaseLock functions. It is noted that the implementation code (or at least analogous code) for this approach could be compiled code generated for any language-specific autoschedule construct.

Thus, any of a variety of approaches may be used to implement various embodiments of the present invention, including graphical and text-based programming languages. Additionally, both explicit and implicit constructs may be employed to implement the auto-schedule functionality described herein. Further details regarding the performance of multiple tests on one or more UUTs are presented below with reference to FIG. 8.

FIG. 7B is a table illustrating execution flow of testing four UUTs (substantially) in parallel using the test sequence of FIG. 7A, according to one embodiment. As FIG. 7B shows, in contrast to the prior art approach of FIG. 7B where the ordered test sequence was applied to each UUT in a staggered fashion to prevent resource request conflicts, in the auto-schedule test sequence of FIG. 7B, the availability of resources required for each test may be used to determine the particular ordering of tests. It should be noted that the execution flow shown is a simplified example of an execution flow, and is intended to illustrate broad concepts of the present invention. In other words, the execution flow shown is exemplary only, and is not intended to limit the actual execution flow of different embodiments of the present invention to any particular form.

In the example shown, while Test 1 is performed on UUT 1 (the first unit under test), during which the respective resource for Test 1 is locked, Test 2 is performed on UUT 2, and Test 3 is performed on UUT 3. Thus, in contrast with the prior art approach in which UUT 1, UUT 2, and the resources associated with Test 2 and Test 3, are idle while Test 1 is performed on UUT 1, in this embodiment, all of the tests are performed (on the respective UUTs) in parallel.

As FIG. 7B also shows, once the initial tests, i.e., the first column of tests in the table, are complete, the tests and their associated resources may be re-allocated to different UUTs. In other words, the respective resources used by each test for the respective UUTs may be unlocked and released, then used to perform the test on another UUT. For example, in the embodiment shown, in the second column of tests, Test 2 is performed on UUT 1, Test 3 is performed on UUT 2, and Test 1 is performed on UUT 4.

It is noted that when there are more units to be tested than tests, there may be slots in the schedule where a UUT is idle, as indicated by the blank slots in the table of FIG. 7B. However, it is further noted that in this case no testing resources are idle for any of the schedule slots. Conversely, when there are more tests to be performed than units to be tested, there may be schedule slots where testing resources, but no UUTs, will be idle.

In the third column of the table, the tests and their associated resources are again respectively re-allocated to different UUTs, with Test 3 performed on UUT 1, Test 1 on UUT 3, and Test 2 on UUT 4, as shown. Once this third test battery is complete, then in the fourth column of the table, Test 1, Test 2, and Test 3 are performed on UUT 2, UUT 3, and UUT 4, respectively, after which the test executive sequence is complete, i.e., terminated.

A visual comparison of the execution flows of FIGS. 7B and 1B may be made to determine an approximate difference in the efficiencies of the two approaches. For example, simply counting the number of blank slots in the two execution flows shows that in the prior art approach there are 12 schedule slots where UUTs are idle, i.e., where no test is being performed on a UUT. In contrast, in the schedule of FIG. 7B, there are four blank schedule slots where a UUT is not being tested. Thus, according to this measure, the approach illustrated in FIG. 7B is one third as inefficient as the prior art approach. It is further noted that the total time required to perform the entire testing procedure is similarly reduced by a third, in that there are six columns in the prior art table, and only four columns in the table of FIG. 7B. It is noted that the above description is an idealized case, in that each of the tests requires the same amount of time to be performed, and that in real world applications the various tests may require substantially different times to be performed.

Further details of the performance of multiple tests on one or more UUTs are presented below with reference to FIG. 8.

Figure 8:
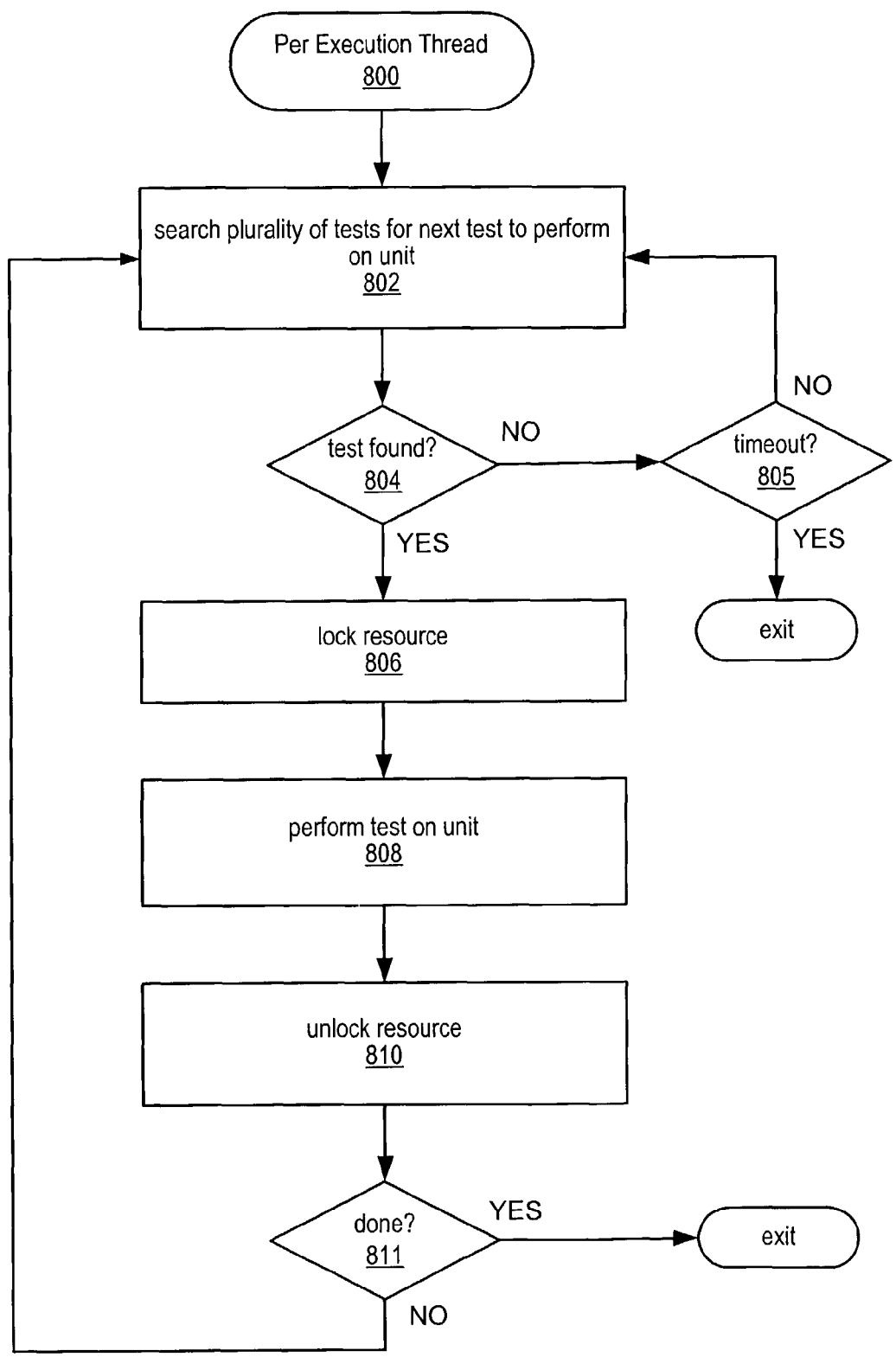
FIG. 8 is a flowchart diagram illustrating one embodiment of a method for performing test executive sequences on one or more units under test in parallel.

FIG. 8—Method for Performing Multiple Tests on One or more Units

FIG. 8 is a flowchart diagram illustrating one embodiment of a method for performing a plurality of tests on one or more units, where portions of at least a subset of the plurality of tests are performed in parallel, or at least substantially in parallel. More specifically, FIG. 8 illustrates one embodiment of a method performed by an execution thread, e.g., associated with a unit under test (UUT). As described above, each test preferably has associated with it a respective resource, used to perform the test on the UUT. It is noted that in various embodiments of the methods described herein, some of the steps may be performed in a different order than shown, or may be omitted. Additional steps may also be performed as desired.

In an embodiment where a plurality of tests are to be performed on each of a plurality of units, each of the plurality of units may have an associated execution thread for performing an embodiment of the method of FIG. 8, where at least a subset of the threads execute in (substantially) parallel fashion. Thus, the method of FIG. 8 may be considered to be performed by each of the plurality of threads for a respective unit, where the threads cooperate and/or compete for resources to perform specific tests. As was noted above, a test may be a single operation, or may be two or more operations or subtests. Similarly, a resource may be a single device or component (or program), or may include multiple devices or components (or programs). Thus, when a test is performed on a unit using a resource, it may be that multiple subtests (i.e., tests) are performed on the unit using a plurality of devices. It should be noted that in other embodiments, described below, the method of FIG. 8 may be performed by a plurality of threads to perform a plurality of tests on a single unit.

As FIG. 8 shows, in 802, the plurality of tests may be searched for a next test to perform on the unit. In one embodiment, the plurality of tests may be searched to determine a respective test to perform on the unit where 1) the respective test has not been performed on the unit, and 2) the respective resource of the respective test is available for use. In other words, an attempt may be made to determine a test whose associated resource is not currently being used to perform another test, or to perform the same test on another unit.

As indicated in FIG. 8, if in 804 the test is not found, e.g., a test that has not yet been performed on the unit and that has an available resource, then in 805, the method may check against a time-out condition, and if a time-out has occurred, the method may exit, as shown. If no time-out has occurred, then the method may continue searching, as indicated in 802. In other words, in the embodiment shown, if the respective test for the respective unit is not found, the method may continue the searching until the respective test is found, or an ending condition, e.g., a time-out condition, is met.

If in 804, the respective test is found, then in 806 the respective resource of the respective test may be locked, where locking includes acquiring the respective resource. In other words, once a free resource for a desired test is determined, the method may lock the resource, thereby excluding use of the resource by execution threads for other tests. The respective test may then be performed on the unit, as indicated in 808. In other words, the locked resource may be used to perform the associated test on the UUT.

One the test has been performed, then in 810, the respective resource of the respective test may be unlocked, where unlocking includes releasing the respective resource. Said another way, when the test has been performed, the resource may be freed for use by other tests/threads. As noted above, in one embodiment, multiple execution threads may operate substantially in parallel, performing respective tests on associated UUTs as the respective resources become available. In other words, two or more of the respective tests on the respective units may be performed substantially concurrently, e.g., by respective execution threads. In another embodiment, at least portions of the searching, locking, performing, and unlocking for a plurality of the respective tests may be performed substantially concurrently.

As FIG. 8 also shows, after the respective resource has been unlocked in 810, then in 811, a determination may be made as to whether an ending condition is met, and if so, the method may exit or terminate, as shown. If the ending condition is not met, then the method may proceed searching for another test to perform on the unit, as shown in 802 and described above. In one embodiment, searching for the next test may include iteratively searching. For example, in one embodiment, the searching, locking, performing, and unlocking may be performed by the execution thread until 1) each of the plurality of tests has been performed on the unit, and/or 2) an ending condition is met. Considering all of the execution threads together, the searching, locking, performing, and unlocking may be performed (by the various execution threads) until 1) each of the plurality of tests has been performed, e.g., on each of the plurality of units, and/or 2) the ending condition is met. The ending condition may include time-outs, equipment failure, manual or automatic termination of the test process, and/or any other type of ending condition.

In other embodiments, additional constraints may be imposed on the search conditions, e.g., on the selection criteria. For example, in one embodiment, certain of the tests to be performed on a unit may need to be performed in a particular order, e.g., a test A may need to be performed before a test B is performed on that unit. As another example, in embodiments where multiple tests may be performed on a single unit (substantially) concurrently, there may be certain combinations of resources which are not allowed, thus, a selection which might otherwise be acceptable may be rejected (at least for a time) if the resource combination constraint would be violated. Thus, although in some embodiments, the order of the tests to be performed on each unit may not matter, in other embodiments, at least some ordering constraints may be imposed on the process.

In a further elaboration of the above embodiment, where multiple tests are to be performed on multiple units, the method may include performing a first test of the plurality of tests on a first unit using a first resource of the plurality of resources. During the performing of the first test, the method may search for a second test of the plurality of tests, where, as noted above, 1) the second test requires a second resource of the plurality of resources, and 2) the second resource is not currently being used. If the second test is found, then the second test is performed on a second unit using the second resource, where performing the second test on the second unit is performed substantially concurrently with at least a portion of said performing the first test on the first unit.

As described above, performing the first test of the plurality of tests on a first unit using a first resource of the plurality of resources may include locking the first resource to exclude use of the first resource by others of the plurality of tests, where locking includes acquiring the first resource for performing the first test. Upon completion of the first test, the method may unlock the first resource, where unlocking includes releasing the first resource for use in performing the first test on another of the plurality of units.

Similarly, the method may further include searching for a third test of the plurality of tests, where 1) the third test requires a third resource of the plurality of resources, and 2) the third resource is not currently being used. If the third test is found, then the third test may be performed on a third unit using the third resource, where performing the third test on the third unit is performed substantially concurrently with performing the first test on the first unit and/or performing the second test on the second unit.

Additionally, the method may also include completing the performance of the first test on the first unit using the first resource, where completing includes unlocking and releasing the first resource for use by others of the plurality of tests, and performing the first test on a different one of the plurality of units using the first resource. In other words, once the first test on the first unit is done, another thread, e.g., associated with a different unit, may operate to perform the first test on the (different) unit.

In one embodiment, the method may further include searching for another, i.e., a different, test of the plurality of tests to be performed on the first unit, wherein 1) the different test requires another, i.e., a different, resource of the plurality of resources, and 2) the different resource is not currently being used. If the different test is found, then the method may perform the different test on the first unit using the different resource, where performing the different test on the first unit is performed substantially concurrently with performing the first test on the different one of the plurality of units. In other words, once the first test has been performed on the first unit, e.g., by a first thread, not only may the method find and perform another test on the first unit, but the method may also find and perform the first test on another unit, assuming that the first test has not yet been performed on the other unit.

The general concepts presented with reference to FIG. 8 may also be applied to performing multiple tests on a single unit. In other words, the method may perform multiple tests on a single unit, where at least a portion of two or more of the tests are performed substantially concurrently. In this embodiment, multiple execution threads may be launched, where each thread may perform an embodiment of the method of FIG. 8 in order to perform a particular test on the UUT. Thus, in one embodiment, if there are three tests to be performed on the unit, three threads may be launched, where each thread is capable of performing any of the three tests on the unit. In other embodiments, the number of threads may not equal the number of tests, but rather two or more threads may operate to perform three or more tests between them.

Thus, similar to the method described above, in one embodiment, the method may include searching the plurality of tests to determine a respective test, where the respective test has not been performed on the unit, and wherein the respective resource of the respective test is available for use. If the respective test is found, the respective resource of the respective test may be locked (acquired), and the respective test performed on the unit. The respective resource of the respective test may then be unlocked (released). In a preferred embodiment, at least portions of the searching, locking, performing, and unlocking for a plurality of the respective tests may be performed substantially concurrently. The searching, locking, performing, and unlocking may be performed iteratively until each of the plurality of tests has been performed on the unit, or until a stopping condition is met, e.g., due to hardware problems, manual termination, etc. Thus, various embodiments of the method of FIG. 8 may be used to perform a plurality of tests on a single unit.

It should be noted that in other embodiments, the two approaches described above may be combined. In other words, multiple threads may be used to perform a plurality of tests on each of a plurality of units, where at least a portion of the tests are performed in substantially parallel fashion, and in doing so, multiple tests may be performed (by multiple threads) on a respective unit in a substantially concurrent manner. Thus, efficiencies resulting from parallel execution of multiple threads may be two-fold, in that not only may different tests be performed on respective different units (in parallel), but different tests may be performed on single units (in parallel), as well.

In some situations, the above described methods may result in thread "starvation", where various factors such as processing bias and/or circumstance may prevent or exclude a thread from acquiring a resource to perform a test. In other words, because each of the threads are effectively competing for test resources, in some cases a particular thread may be prevented from ever (or at least for a relatively long time, e.g., until a time-out condition occurs) acquiring a resource. Thus, in an embodiment of the method where the searching, locking, performing, and unlocking are performed by a respective execution thread, each of the plurality of resources may be associated with it a respective queue structure or its equivalent, e.g., a FIFO (first in, first out), for storing threads waiting for the respective resource. In this case, searching the plurality of tests to determine a respective test may include each thread examining the plurality of resources to determine a free resource (i.e., unlocked), and if a free resource is found, determining the respective test associated with the free resource. If no free resource is found, the method may determine a resource of the plurality of resources with fewest threads in the FIFO for that resource, and add the thread to the FIFO for that resource.

In other words, each resource may have associated with it a queue that allows threads to wait for a particular resource to become available. By selecting the FIFO with the least number of queued threads (if no free resources for needed tests are found), the thread is added to the waiting list for the resource with the least current demand.

In one embodiment, when the respective resource is acquired, i.e., when the execution thread locks the resource, the thread may be removed from any other FIFOs storing the thread. In other words, once the thread successfully finds a free resource, the thread may be removed from any FIFOs in which the thread is still waiting.

Figure 9A:
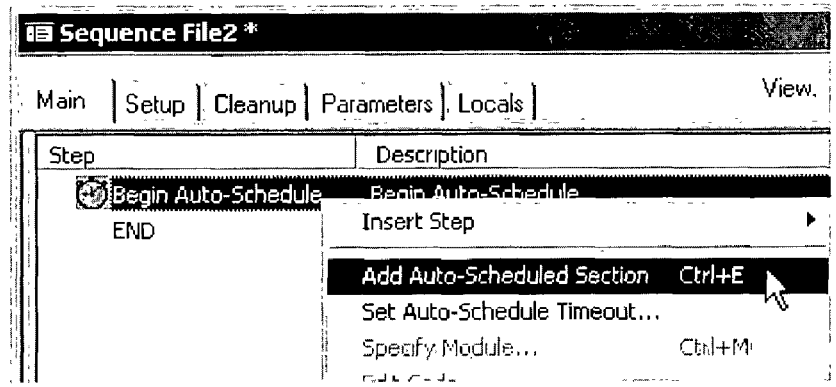
FIGS. 9A and 9B illustrate creation of an auto-schedule test sequence using a graphical user interface, according to one embodiment.
Figure 9B:
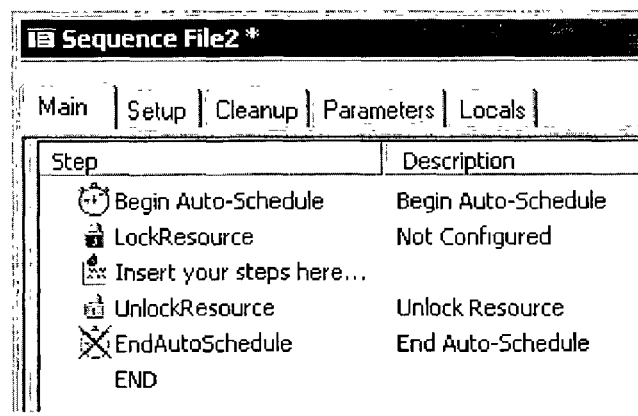

FIGS. 9A and 9B—Creating an Auto-Schedule Test Sequence

While in many embodiments, the auto-scheduled test sequences described above may be generated manually by a user, e.g., using various development environments such as National Instruments LabVIEW and LabWindows/CVI, the Visual Basic application development environments, and various text-based development environments, it may be desirable to provide means for more easily generating auto-scheduled test sequences. Thus, in one embodiment, program instructions implementing a tool or interface for generating auto-schedule test sequences may be provided in the form of a stand-alone application, a dynamic linked library, and/or a plug-in program module for an existing application, such as, for example, National Instruments TestStand. In another embodiment, the program instructions may simply be integrated into an existing program, thereby extending the functionality of the program to include the desired features.

FIG. 9A illustrates on embodiment of a graphical user interface (GUI) for creating an auto-schedule test executive sequence. FIG. 9B illustrates an example test sequence file generated using the GUI of FIG. 9A. It should be noted that the embodiment shown in FIGS. 9A and 9B is exemplary only, and is not intended to limit the GUI to any particular form, functionality, or appearance.

As mentioned above, in a preferred embodiment, for a test sequence to be performed in auto-scheduled mode, at least one auto-scheduled block plus one or more auto-scheduled sections may be included. Thus, in the GUI shown in FIG. 9A, menu options may be presented to the user for creating, modifying, and otherwise specifying the auto-scheduled block and the one or more auto-scheduled sections. In other words, in one embodiment, a test sequence may be created in response to user input, where creating the test sequence includes receiving user input requesting an automatic scheduling feature, and programmatically creating one or more steps in the test sequence to enable the automatic scheduling feature. In one embodiment, the one or more steps may include at least one auto-schedule block, including a plurality of auto-scheduled sections, where each auto-scheduled section specifies a respective test of the plurality of tests, and a respective resource of the plurality of resources for use in performing the respective test, as was described in detail above.

In other words, when creating a sequence, the user may simply insert a "Begin Auto-Schedule" step. This step may include configuration menus that allow the user to add auto-scheduled sections and/or a timeout, e.g., by right clicking on the "Begin Auto-Schedule" step and selecting the option "Add Auto-Scheduled Section", as shown in FIG. 9A. Thus, in one embodiment, for ease of use, the GUI may automatically insert additional steps that are needed.

In the embodiment shown in FIG. 9A, a "Begin Auto-Schedule" step and a corresponding "END" step have been generated, e.g., in response to user input received by the GUI. As FIG. 9A also shows, once the begin/end steps of the auto-schedule block have been added to the test sequence file, the user may select another menu option indicating the addition of an auto-scheduled section, resulting in insertion of an auto-scheduled section (including a "Lock Resource" and an "Unlock Resource" step) as well as an "End Auto-Schedule" step. In the example shown, a label is also added that shows where the user test steps must be added for each auto-scheduled section. Note that in the embodiment shown, prior to receiving user input specifying the particular resource to be used by these additional steps, the GUI describes the "Lock-Resource" step as "Not Configured". Thus, in response to receiving user input indicating the addition of an auto-schedule section, the GUI may programmatically insert one or more steps in the test sequence for specifying a respective test to be performed. This operation may be repeated as many times as needed for each application. For example, if an application requires locking three sets of instruments, then three auto-scheduled sections may be inserted.

Once an auto-scheduled section has been inserted, the resource (or group of resources) that section will utilize may be configured. For example, in one embodiment, the resource may be configured by right clicking on the corresponding "Lock Resource" step and selecting the option "Configure Lock Resource . . . ". A pop-up dialog may be displayed and the user may provide input, e.g., a string, indicating the name of the resource to lock, or a selection from a list of available resources. If the section utilizes more than one resource, an array of strings may be entered, where each string contains the name of the resource to lock. The "Lock Resource" step may automatically create a Lock for each of the names indicated, i.e., manual creation of the locks may not be required. In one embodiment, if a Lock for an indicated resource (name) already exists, the "Lock Resource" step type may connect to the existing Lock.

Thus, in a preferred embodiment, further user input may be received by the GUI specifying the resource and the desired steps needed to perform the respective test using that resource, as indicated by the "Insert Step" menu option shown in FIG. 9A. The user may thus add and specify successive auto-schedule sections for the auto-schedule block, where each section indicates or performs a respective test using a respective resource.

As mentioned above, in one embodiment, the auto-scheduled step types may include a timeout feature, thus, in addition to specifying the auto-schedule sections, an option may be presented to the user for specifying a time-out condition for the auto-schedule block, as also shown in the GUI of FIG. 9A. In one embodiment, the specified timeout may be applied to all of the auto-scheduled sections. In other words, the auto-scheduled steps may be viewed as a group or block that performs a particular function, e.g., a test suite, and thus, in this embodiment, the timeout may be defined at the top level and may be applied to every auto-scheduled section inside the auto-schedule block. If an auto-scheduled block times-out, it indicates that one of the auto-scheduled sections was not able to acquire its resources within the specified time. In one embodiment of the GUI of FIG. 9A, a timeout may be set by right clicking on the "Begin Auto-Scheduled" step and selecting the option "Set Auto-Schedule Timeout . . . ". A pop-up dialog may be displayed presenting the option to enable or disable the timeout for the current block. In one embodiment, the GUI may also allow the user to specify whether a timeout causes a runtime error or simply terminates.

It should be noted that the above approach may be used to generate additional auto-schedule blocks, with respective auto-schedule sections, time-out specifications, etc. It should be further noted that although the above embodiments are described in terms of menus and dialogs, any other types of interface elements may be used as desired, including, for example, drag-and-drop techniques, e.g., where a user drags and drops icons representing the various test steps onto the test sequence, text-based scripting or natural-language parsing, wizard-based approaches, where a sequence of panels or dialogs leads the user through the test sequence generation process, and so on.

Thus, in various embodiments, auto-schedule test sequences may be created that substantially improve efficiencies of test procedures by reducing testing resource idle time. Additionally, the auto-schedule test sequences may be generated via a GUI, where the GUI programmatically inserts steps and/or structures into the test sequence in response to user input.

Various embodiments further include receiving or storing instructions and/or data implemented in accordance with the foregoing descriptions upon a carrier medium. Suitable carrier media include a memory medium as described above, as well as signals such as electrical, electromagnetic, or digital signals, conveyed via a communication medium such as networks and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A computer-implemented method comprising:
a computer system creating a test executive sequence in response to user input, wherein creating the test executive sequence comprises:
   the computer system including an auto-schedule block in the test executive sequence in response to user input requesting inclusion of an automatic scheduling feature in the test executive sequence, wherein including the auto-schedule block comprises displaying a visual indication in the test executive sequence that an execution order for test steps within the auto-schedule block is not fixed and should be automatically determined during execution of the test executive sequence; and
   the computer system including a plurality of test steps in the auto-schedule block in response to user input selecting each respective test step of the plurality of test steps and requesting inclusion of the respective test step in the auto-schedule block, wherein each respective test step specifies a corresponding test, wherein an execution order for the plurality of test steps is not fixed, and wherein including the plurality of test steps in the auto-schedule block configures their execution order to be automatically determined during execution of the test executive sequence;
wherein the method further comprises the computer system concurrently executing the test executive sequence on a plurality of physical units under test (UUTs), wherein each respective UUT comprises a respective physical device, wherein the test executive sequence is executed on each respective UUT by a respective thread;
wherein for each respective thread, the computer system automatically determines an order in which the respective thread should execute the plurality of test steps in response to determining that the plurality of test steps are included in the auto-schedule block, wherein the respective thread executes the plurality of test steps in the determined order;
wherein the computer system determines that a first thread should execute a first step of the plurality of test steps before a second step of the plurality of test steps, and wherein the computer system determines that a second thread should execute the second step before the first step.

2. The method of claim 1,
wherein each of the tests specified by the plurality of test steps requires a respective physical resource;
wherein for each respective thread, said automatically determining the order and said executing the plurality of test steps in the determined order comprise:
   programmatically searching the tests to select a respective test according to search criteria specifying that 1) the respective test has not yet been performed on the respective UUT corresponding to the respective thread, and 2) the respective physical resource required by the respective test is available for use;
   locking the respective physical resource required by the respective test, wherein said locking comprises acquiring the respective physical resource;
   the respective thread performing the respective test on the respective UUT corresponding to the respective thread; and
   unlocking the respective physical resource required by the respective test, wherein said unlocking comprises releasing the respective physical resource.

3. The method of claim 2,
wherein said searching, said locking, said performing, and said unlocking are repeatedly performed by the computer system until each of the plurality of tests has been executed by each respective thread.

4. The method of claim 2,
wherein said programmatically searching the tests comprises iteratively searching the tests.

5. The method of claim 1,
wherein each test step of the plurality of test steps requires a respective physical resource;
wherein creating the test executive sequence further comprises:
for each respective test step of the plurality of test steps, the computer system receiving user input specifying the respective physical resource required by the respective test step.

6. The method of claim 1,
wherein each of the tests specified by the plurality of test steps requires a respective physical resource;
wherein for each respective thread, the order in which the thread should execute the plurality of test steps is automatically determined by the computer system based on availability of the physical resources required by the tests.

7. The method of claim 1,
wherein creating the test executive sequence further comprises the computer system including a plurality of auto-scheduled sections in the auto-schedule block in response to user input;
wherein said including the plurality of test steps in the auto-schedule block comprises including each respective test step in a corresponding auto-scheduled section.

8. The method of claim 7, wherein each respective auto-scheduled section in the plurality of auto-scheduled sections includes:
a lock resource step, wherein the lock resource step indicates locking a respective resource, wherein the test step included in the respective auto-scheduled section requires locking of the respective resource; and
an unlock resource step, wherein the unlock resource step indicates unlocking the respective resource.

9. The method of claim 1,
wherein the auto-schedule block includes a begin step, wherein the begin step indicates initiation of the auto-schedule block;
wherein the auto-schedule block also includes an end step, wherein the end step indicates termination of the auto-schedule block;
wherein said including the plurality of test steps in the auto-schedule block comprises including the plurality of test steps between the begin step and the end step;
wherein the method further comprises the computer system displaying the begin step and the end step within the test executive sequence.

10. The method of claim 1, further comprising:
the computer system displaying the test executive sequence on a display, wherein the displayed test executive sequence visually indicates that the plurality of test steps are included in the auto-schedule block.

11. The method of claim 1,
wherein creating the test executive sequence further comprises the computer system receiving user input specifying one or more ordering constraints imposed on at least a subset of the plurality of test steps;
wherein for each respective thread, the order in which the thread should execute the plurality of test steps is automatically determined by the computer system at least in part based on the one or more ordering constraints.

12. The method of claim 1,
wherein said creating the test executive sequence comprises the computer system storing information in one or more data structures, wherein the information in the one or more data structures represents the test executive sequence.

13. A non-transitory computer-readable memory medium storing program instructions executable to:
create a test executive sequence in response to user input, wherein in creating the test executive sequence the program instructions are executable to:
include an auto-schedule block in the test executive sequence in response to user input requesting inclusion of an automatic scheduling feature in the test executive sequence, wherein in including the auto-schedule block the program instructions are executable to display a visual indication in the test executive sequence which visually indicates that an execution order for test steps within the auto-schedule block is not fixed and should be automatically determined during execution of the test executive sequence; and
include a plurality of test steps in the auto-schedule block in response to user input selecting each respective test step of the plurality of test steps and requesting inclusion of the respective test step in the auto-schedule block, wherein each respective test step specifies a corresponding test, wherein an execution order for the plurality of test steps is not fixed, and wherein in including the plurality of test steps in the auto-schedule block the program instructions are executable to configure their execution order to be automatically determined during execution of the test executive sequence;
wherein the program instructions are further executable to concurrently execute the test executive sequence on a plurality of physical units under test (UUTs), wherein each respective UUT comprises a respective physical device, wherein the test executive sequence is executed on each respective UUT by a respective thread;
wherein for each respective thread, the program instructions are executable to automatically determine an order in which the respective thread should execute the plurality of test steps in response to determining that the plurality of test steps are included in the auto-schedule block; and
wherein the program instructions are executable to determine that a first thread should execute a first step of the plurality of test steps before a second step of the plurality of test steps, and wherein the program instructions are executable to determine that a second thread should execute the second step before the first step.

14. The computer-readable memory medium of claim 13, wherein each of the tests specified by the plurality of test steps requires a respective physical resource;
wherein the program instructions are executable to:
programmatically search the tests to select a respective test according to search criteria specifying that 1) the respective test has not yet been performed on a respective UUT, and 2) the respective physical resource required by the respective test is available for use;
lock the respective physical resource required by the respective test, wherein said locking comprises acquiring the respective physical resource;
perform the respective test on the respective UUT; and
unlock the respective physical resource required by the respective test, wherein said unlocking comprises releasing the respective physical resource.

15. The computer-readable memory medium of claim 14, wherein for each respective UUT of the plurality of UUTs, the program instructions are executable to perform said searching, said locking, said performing, and said unlocking repeatedly until each of the plurality of tests has been performed on the respective UUT.

16. The computer-readable memory medium of claim 14, wherein said programmatically searching the tests comprises iteratively searching the tests.

17. The computer-readable memory medium of claim 13, wherein each test step of the plurality of test steps requires a respective physical resource;
wherein in creating the test executive sequence the program instructions are further executable to:
for each respective test step of the plurality of test steps, receive user input specifying the respective physical resource required by the respective test step.

18. The computer-readable memory medium of claim 13, wherein each of the tests specified by the plurality of test steps requires a respective physical resource;
wherein for each respective thread, the program instructions are executable to automatically determine the order in which the thread should execute the plurality of test steps based on availability of the physical resources required by the tests.

19. The computer-readable memory medium of claim 13, wherein the program instructions are further executable to include a plurality of auto-scheduled sections in the auto-schedule block in response to user input;
wherein in including the plurality of test steps in the auto-schedule block, the program instructions are executable to include each respective test step in a corresponding auto-scheduled section.

20. The computer-readable memory medium of claim 19, wherein each respective auto-scheduled section in the plurality of auto-scheduled sections includes:
a lock resource step, wherein the lock resource step indicates locking a respective resource, wherein the test step included in the respective auto-scheduled section requires locking of the respective resource; and
an unlock resource step, wherein the unlock resource step indicates unlocking the respective resource.

21. The computer-readable memory medium of claim 13, wherein the auto-schedule block includes a begin step, wherein the begin step indicates initiation of the auto-schedule block;
wherein the auto-schedule block also includes an end step, wherein the end step indicates termination of the auto-schedule block;
wherein the program instructions are executable by the at least one processor to include the plurality of test steps in the auto-schedule block between the begin step and the end step;
wherein the program instructions are further executable to display the begin step and
the end step within the test executive sequence.

22. The computer-readable memory medium of claim 13, wherein the program instructions are further executable to:
display the test executive sequence on a display, wherein the displayed test executive sequence visually indicates that the plurality of test steps are included in the auto-schedule block.

23. The computer-readable memory medium of claim 13,
wherein in creating the test executive sequence the program instructions are further executable to receive user input specifying one or more ordering constraints imposed on at least a subset of the plurality of test steps;
wherein for each respective thread, the program instructions are executable to automatically determine the order in which the thread should execute the plurality of test steps based at least in part on the one or more ordering constraints.

24. The computer-readable memory medium of claim 13,
wherein in creating the test executive sequence the program instructions are executable to store information in one or more data structures, wherein the information in the one or more data structures represents the test executive sequence.

25. A system comprising:
at least one processor; and
a memory medium storing program instructions;
wherein the program instructions are executable by the at least one processor to:
create a test executive sequence in response to user input, wherein in creating the test executive sequence the program instructions are executable by the at least one processor to:
include an auto-schedule block in the test executive sequence in response to user input requesting inclusion of an automatic scheduling feature in the test executive sequence, wherein in including the auto-schedule block the program instructions are executable by the at least one processor to display a visual indication in the test executive sequence which visually indicates that an execution order for test steps within the auto-schedule block is not fixed and should be automatically determined during execution of the test executive sequence; and
include a plurality of test steps in the auto-schedule block in response to user input selecting each respective test step of the plurality of test steps and requesting inclusion of the respective test step in the auto-schedule block, wherein each respective test step specifies a corresponding test, wherein an execution order for the plurality of test steps is not fixed, and wherein in including the plurality of test steps in the auto-schedule block the program instructions are executable by the at least one processor to configure their execution order to be automatically determined during execution of the test executive sequence;
wherein the program instructions are further executable by the at least one processor to concurrently execute the test executive sequence on a plurality of physical units under test (UUTs), wherein each respective UUT comprises a respective physical device, wherein the test executive sequence is executed on each respective UUT by a respective thread;
wherein for each respective thread, the program instructions are executable by the at least one processor to automatically determine an order in which the respective thread should execute the plurality of test steps in response to determining that the plurality of test steps are included in the auto-schedule block; and
wherein the program instructions are executable by the at least one processor to determine that a first thread should execute a first step of the plurality of test steps before a second step of the plurality of test steps, and wherein the program instructions are executable by the at least one processor to determine that a second thread should execute the second step before the first step.

26. The system of claim 25,
wherein each of the tests specified by the plurality of test steps requires a respective physical resource;
wherein the program instructions are executable by the at least one processor to:
programmatically search the tests to select a respective test according to search criteria specifying that 1) the respective test has not yet been performed on a respective UUT, and 2) the respective physical resource required by the respective test is available for use;
lock the respective physical resource required by the respective test, wherein said locking comprises acquiring the respective physical resource;
perform the respective test on the respective UUT; and
unlock the respective physical resource required by the respective test, wherein said unlocking comprises releasing the respective physical resource.

27. The system of claim 26,
wherein for each respective UUT of the plurality of UUTs, the program instructions are executable by the at least one processor to perform said searching, said locking, said performing, and said unlocking repeatedly until each of the plurality of tests has been performed on the respective UUT.

28. The system of claim 26,
wherein said programmatically searching the tests comprises iteratively searching the tests.

29. The system of claim 25,
wherein each test step of the plurality of test steps requires a respective physical resource;
wherein in creating the test executive sequence the program instructions are further executable by the at least one processor to:
for each respective test step of the plurality of test steps, receive user input specifying the respective physical resource required by the respective test step.

30. The system of claim 25,
wherein each of the tests specified by the plurality of test steps requires a respective physical resource;
wherein for each respective thread, the program instructions are executable by the at least one processor to automatically determine the order in which the thread should execute the plurality of test steps based on availability of the physical resources required by the tests.

31. The system of claim 25,
wherein the program instructions are further executable by the at least one processor to include a plurality of auto-scheduled sections in the auto-schedule block in response to user input;
wherein in including the plurality of test steps in the auto-schedule block, the program instructions are executable by the at least one processor to include each respective test step in a corresponding auto-scheduled section.

32. The system of claim 31, wherein each respective auto-scheduled section in the plurality of auto-scheduled sections includes:
a lock resource step, wherein the lock resource step indicates locking a respective resource, wherein the test step included in the respective auto-scheduled section requires locking of the respective resource; and
an unlock resource step, wherein the unlock resource step indicates unlocking the respective resource.

33. The system of claim 25,
wherein the auto-schedule block includes a begin step, wherein the begin step indicates initiation of the auto-schedule block;
wherein the auto-schedule block also includes an end step, wherein the end step indicates termination of the auto-schedule block;
wherein the program instructions are executable by the at least one processor to include the plurality of test steps in the auto-schedule block between the begin step and the end step;
wherein the program instructions are further executable by the at least one processor to display the begin step and the end step within the test executive sequence.

34. The system of claim 25, wherein the program instructions are further executable by the at least one processor to:
display the test executive sequence on a display, wherein the displayed test executive sequence visually indicates that the plurality of test steps are included in the auto-schedule block.

35. The system of claim 25,
wherein in creating the test executive sequence the program instructions are further executable by the at least one processor to receive user input specifying one or more ordering constraints imposed on at least a subset of the plurality of test steps;
wherein for each respective thread, the program instructions are executable by the at least one processor to automatically determine the order in which the thread should execute the plurality of test steps based at least in part on the one or more ordering constraints.

36. The system of claim 25,
wherein in creating the test executive sequence the program instructions are executable by the at least one processor to store information in one or more data structures, wherein the information in the one or more data structures represents the test executive sequence.

* * * * *